3,120,514
AMINOALKYLPENICILLINS
Frank Peter Doyle, Betchworth, and John Herbert Charles Nayler and Harry Smith, Dorking, England, assignors to Beecham Research Laboratories Limited, Brentford, England, a British company
No Drawing. Filed Sept. 12, 1962, Ser. No. 223,255
Claims priority, application Great Britain Oct. 6, 1958
12 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to ω-aminoalkyl penicillins, α-amino-β-hydroxyalkyl and α-amino-β-hydroxy-β - (substituted phenyl) ethyl penicillins, α-substituted-α-aminomethyl-penicillins and nontoxic salts thereof.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith and are safe for use in patients who cannot be given benzylpenicillin because they exhibit allergic reactions thereto.

There is provided, according to the present invention, a member selected from the group consisting of acids having the formula (I) 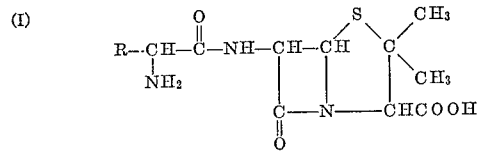

wherein R is a member selected from the group consisting of alkyl, cycloalkyl, indolylalkyl, naphthyl, benzyl and furyl; and (II) 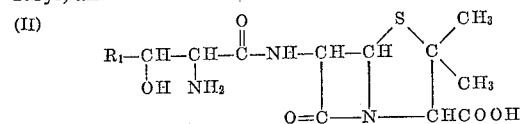

wherein $R_1$ is selected from the group consisting of hydrogen, (lower) alkyl, benzyl and radicals having the formula

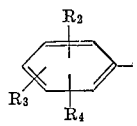

wherein $R_2$, $R_3$ and $R_4$ each represent a member selected from the group consisting of hydrogen, nitro, di(lower)-alkylamino, (lower)alkanoylamino, (lower)alkanoyloxy, (lower)alkyl, (lower)alkoxy, sulfamyl, chloro, iodo, bromo, fluoro, and trifluoromethyl; and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzylbeta-phenethylamine, 1-ephenamine, N,N'-dibenzylethylenediamine, dehydroabietylamine, N,N'-bis - dehydroabietylethylenediamine, N-(lower)alkylpiperidine (e.g., ethylpiperidine), and other amines which have been used to form salts with benzylpenicillin. The alkyl groups referred to above include alkyl groups having from 1 to 20 carbon atoms; the preferred alkyl groups are the (lower)alkyl groups which have from 1 to 6 carbon atoms inclusive such as methyl, ethyl, propyl, isopropyl, n-butyl, isobutyl, n-amyl, α-methylbutyl, β-methylbutyl, etc. The term "(lower)-alkyl" as used herein refers to both straight and branched chain saturated aliphatic radicals having from one to ten carbon atoms.

According to another aspect of this invention, there is provided a member selected from the group consisting of an acid having the formula (III) 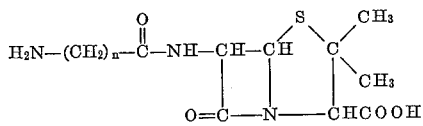

wherein $n$ is an integer from 1 to 20; and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidine and other amines which have been used to form salts with benzylpenicillin. A preferred group of compounds are those wherein $n$ in Formula III, above, is an integer from 1 to 5 inclusive.

Also included within the scope of the present invention are easily hydrolyzed esters of compounds I, II and III which are converted to the free acid form by chemical or enzymatic hydrolysis.

The α-carbon atom of the acyl group in the compounds of Formulas I and II, above, is an asymmetric carbon atom and the compounds of this invention can therefore exist in two optically active isometric forms (the D- and L-diastereoisomers), as well as in a mixture of the two optically active forms; all such isomeric forms of the compounds are included within the scope of the present invention.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

The products of Formula I, above, are prepared by reaction of 6-aminopenicillanic acid with an acid chloride of the formula

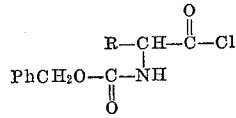

wherein R has the meaning set forth above. The products of Formula II, above, are prepared by reaction of 6- aminopenicillanic acid with an acid chloride of the formula

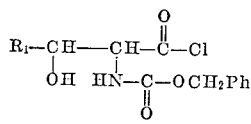

wherein $R_1$ has the meaning set forth above. The products of Formula III, above, are prepared by reaction of 6-aminopenicillanic acid with an acid chloride of the formula

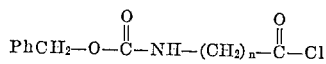

wherein $n$ represents an integer from 1 to 20. In these reactions, the 6-aminopenicillanic acid is preferably used in the form of a neutral salt such as the sodium salt or the triethylamine salt. Functional equivalents of the acid chlorides set forth above, such as the corresponding carboxylic acid bromides, acid anhydrides and mixed anhydrides with other carboxylic acids, including monoesters, and particularly lower aliphatic esters of carbonic acid. The protecting group, $PhCH_2OCO$— in the above formulas may be replaced by other functionally equivalent protecting groups as set forth below. After the acid chloride or its functional equivalent, is reacted with 6-aminopenicillanic acid, the protecting group is removed from the amino radical by hydrogenation under sufficiently mild conditions to avoid destruction of the penicillin nucleus.

The protected amino acid is preferably prepared by the method described in Example 1 below, which method is also discussed in "A Textbook of Biochemistry," by P. H. Mitchell, at page 113. In the next step, the 6-aminopenicillanic acid may be reacted with a mixed anhydride prepared by reacting the amino-substituted carobxylic acid, or a salt thereof, having its groups protected, with an ester of chlorocarbonic acid, e.g., ethyl chlorocarbonate. Alternatively, the protected amino-substituted carboxylic acid may be converted to a reactive acid halide.

The several methods used to form the protected amino-acid derivative are standard procedures employed in peptide synthesis and include the use of a reactive acid azide or a carbodi-imide reagent cf. Sheehan and Hess, J. Amer. Chem. Soc., 1955, 77, 1067. The subsequent removal of the protecting group to form the free amino-substituted penicillin is effected by catalytic hydrogenation. Suitable protecting groups are of the general formula $R''O.CO$—, where $R''$ is an allyl, benzyl (as shown in the formula above), substituted benzyl, phenyl or substituted phenyl group, or the trityl group $Ph_3.C$—. The abbreviation "Ph" as used herein represents the phenyl group.

Thus, an elegant procedure for preparing amino-acid derivatives of 6-aminopenicillanic acid (in which the amino group is protected) by way of a mixed anhydride with ethoxy or isobutoxy-carbonic acid comprises mixing 0.01 mole of an acid having its amino group protected (whose acid chloride is set forth above), 0.01 mole isobutyl chloroformate and 0.011 mole tertiary hydrocarbonyl or aliphatic amine such as triethylamine in an anhydrous, inert, and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials.

The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$ and the carbobenzoxy group protecting the amino group is removed by hydrogenation. The product in its free acid form is then converted to any desired metal or amine salt by treatment in an appropriate solvent, e.g., with the appropriate base, e.g., a free amine such as procaine base or a solution of potassium 2-ethylhexanoate in dry n-butanol. These salts are usually insoluble in solvents such as ether and can be recovered in pure form by simple filtration.

The removal of the protecting group is effected by allowing the protected aminoacyl derivative of 6-aminopenicillanic acid to react with hydrogen in the presence of a catalyst. This hydrogenation is normally carried out at room temperature and at atmospheric pressure, the pH of the reaction mixture being from 5 to 9. The solvent for the hydrogenation reaction is normally water, but other non-reducible solvents such as ethyl alcohol or dioxane or mixtures of these with water may be employed. The preferred hydrogenated catalyst is palladium but other catalysts such as platinum or rhodium may be used. The catalyst is preferably employed on an inert support, e.g., of barium carbonate or carbon.

When a carbon atom next to that carrying the carbobenzyloxyamino group to be reduced forms part of an aromatic ring, the hydrogenation step is normally completed in a single treatment with hydrogen and catalyst. However, in all other cases, i.e., when the carbon atom next to that carrying the carbobenzyloxyamine group to be reduced is of an aliphatic nature, in order to effect complete reduction it may be necessary to hydrogenate in the presence of two or more successive lots of catalyst.

Another method of preparing an ethereal solution of the acid form of the carbobenzoxy derivative of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt and the protecting groups are then removed from the amino groups by hydrogenation as described above. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases.

At the conclusion of the foregoing reaction, the products in which the amino groups are protected are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257–258, January 24, 1959), or Belgian Patent 569,728. It is used in the above reactions as the salt of a metal or a tertiary hydrocarbonyl amine or as an ester of a hydrocarbonyl alcohol.

Hydrocarbonyl alcohols and tertiary hydrocarbonyl amines are compounds having the formulae

and

wherein the R groups contain only the elements carbon and hydrogen.

The following examples will serve to illustrate this invention without limiting it thereto.

EXAMPLE 1

N-carbobenzyloxy-DL-norleucine (0.1 mole), which is obtained by the reaction of equivalent quantities of DL-norleucine and benzyl chlorocarbonate in aqueous sodium hydroxide, dissolved in dry acetone is stirred and cooled to about −5° C. To this there is added dropwise with continued cooling and stirring a solution of ethyl chlorocarbonate (0.1). After approximately ten minutes, the acylating mixture is cooled to about −5° C. and then is slowly added to a stirred ice cold mixture of 6-aminopenicillanic acid (0.1 mole), 3% sodium bicarbonate (0.1 mole) and acetone. This reaction mixture is allowed to attain room temperature, stirred for an additional thirty minutes and then is extracted with ether. The extracted aqueous solution is covered with butanol and the pH adjusted to 2 by the addition of N hydrochloric acid. The acidified aqueous phase is extracted with butanol, the pH of the aqueous phase being adjusted to 2 each time. The combined butanol solutions, which contains the α-carbobenzyloxyaminopentyl penicillin, are washed with water to which sufficient 3% sodium bicarbonate solution to bring the aqueous phase to pH 7 has been added. This process of washing and shaking is repeated with fresh water and bicarbonate solution. The combined aqueous solutions are washed with water and then are evaporated under reduced pressure and low temperature. The product, the sodium salt of α-carbobenzyloxyaminopentyl penicillin, is obtained as a yellow solid in a yield of 27%.

EXAMPLE 2

A suspension of palladium on barium carbonate (7.3 gms. of 30%) in water is shaken in an atmosphere of hydrogen at room temperature and atmospheric pressure for two hours. After this treatment, the catalyst is collected and washed well with water, care being taken that it does not become dry. The sodium salt of α-carbobenzyloxyaminopentyl penicillin (50% pure, 4.5 gms.) is added to an aqueous suspension of the pretreated catalyst and the pH adjusted to 8.0 with 3% sodium bicarbonate solution. The mixture is then shaken under hydrogen at room temperature and atmospheric pressure for 45 minutes. A second quantity of pretreated catalyst is added and hydrogenation is continued for an additional 45 minutes and then a third quantity is added and the process repeated. The catalyst is filtered off, washed with water, and the filtrate, after adjusting to pH 7.0 with N-hydrochloric acid, is evaporated to dryness under reduced pressure at a temperature below 20° C. The α-aminopentyl penicillin was obtained in a 40% yield, which assayed at 30% pure. Paper chromatography showed only one antibiotic with a considerably different $R_F$ value from the starting material. It was stable in acid solution and shown to inhibit Staph. aureus at a concentration of 2.5 mcg./ml.

EXAMPLE 3

Following the general procedure of Example 1 above, α-aminobutyric acid, alanine, valine, norvaline, leucine, isoleucine, α-aminocapric acid, α-aminolauric acid, and α-aminostearic acid, respectively, are each reacted with benzyl chlorocarbonate to protect the α-amino group, then with ethyl chlorocarbonate to form the mixed anhydride and then with 6-aminopenicillanic acid to form an α-carbobenzyloxyaminoalkyl penicillin which is then hydrogenated to produce α-aminopropyl penicillin, α-amino-ethyl penicillin, α-aminoisobutyl penicillin, α-amino-n-butyl penicillin, α-amino-α-methylbutyl penicillin, α-amino-β-methylbutyl penicillin, α-aminononyl penicillin, α-aminoundecyl penicillin, and α-aminoheptadecyl penicillin, respectively, each of which is isolated and found to inhibit Staph. aureus at a concentration of 0.001 percent by weight.

EXAMPLE 4

The use of α-carbobenzyloxyaminooctanoic acid (0.1 mole), which is obtained by the reaction of equivalent quantities of α-aminooctanoic acid and benzylchlorocarbonate in aqueous sodium hydroxide, in the process of Example 1, in the place of N-carbobenzyloxy-DLnorleucine, results in the formation of the sodium salt of 5-carbobenzyloxyaminoheptyl penicillin (43% yield).

EXAMPLE 5

When the sodium salt of α-carbobenzyloxyaminoheptyl penicillin is hydrogenated in the presence of four successive portions of pretreated palladium on barium carbonate catalyst as described in the process of Example 2, a 44% yield (47% pure) of α-aminoheptyl penicillin is obtained. Paper chromatography showed only antibiotic with a considerably different $R_F$ value from the starting material. It is stable in acid solution and shown to inhibit *Staph. aureus* at a concentration of 0.012 mcg./ml.

EXAMPLE 6

The use of α-carbobenzyloxyaminocyclohexylacetic acid (0.1 mole), which is obtained by the reaction of equivalent quantities of α-aminocyclohexylacetic acid and benzyl chlorocarbonate in aqueous sodium hydroxide, in the process of Example 1, in the place of N-carbobenzyloxy-DL-norleucine, results in the formation of the sodium salt of α-carbobenzyloxyaminocyclohexylmethyl pencillin (51% yield).

EXAMPLE 7

When the sodium salt of α-carbobenzyloxyaminocyclohexylmethylpenicillin is hydrogenated in the presence of three successive portions of pretreated palladium on barium carbonate catalyst as described in the process of Example 2, a 51% yield (46% pure) of α-aminocyclohexylmethylpenicillin is obtained. Paper chromatography showed only one antibiotic with a considerably different $R_F$ value from the starting material. It was stable in acid solution and shown to inhibit *Staph. aureus* at a concentration of 0.12 mcg./ml.

EXAMPLE 8

The use of N-carbobenzyloxy-β-phenylalanine (0.1 mole), which is obtained by the reaction of equivalent quantities of β-phenylalanine and benzylchlorocarbonate in aqueous sodium hydroxide, in the process of Example 1, in the place of N-carbobenzyloxy-DL-norleucine, results in the formation of the sodium salt of α-carbobenzyloxyamino-β-phenylethylpenicillin.

EXAMPLE 9

When the sodium salt of α-carbobenzyloxyamino-β-phenylethylpenicillin is hydrogenated in the presence of three successive portions of pretreated palladium on barium carbonate catalyst as described in the process of Example 2, a 49% yield (30% pure) of α-amino-β-phenylethylpenicillin is obtained. Paper chromatography showed only one antibiotic with a considerably different $R_F$ value from the starting material. It was stable in acid solution and shown to inhibit *Staph. aureus* at a concentration of 0.6 mcg./ml.

EXAMPLE 10

The use of N-carbobenzyloxy-tryptophan (0.1 mole), which is obtained by the reaction of equivalent quantities of tryptophan and benzyl chlorocarbonate in aqueous sodium hydroxide, in the process of Example 1, in the place of N-carbobenzyloxy-DL-norleucine, results in the formation of the sodium salt of α-carbobenzyloxyamino-β-3-indolylethylpenicillin (83% yield).

EXAMPLE 11

When the sodium salt of α-carbobenzyloxyamino-β-3-indolylethylpenicillin (77% pure) is hydrogenated in the presence of three successive portions of pretreated palladium on barium carbonate catalyst as described in the process of Example 2, a 47% yield (44% pure) of α-amino-β-3-indolylethylpenicillin is obtained. Paper chromatography showed only one antibiotic with a considerably different $R_F$ value from the starting material. It was stable in acid solution and shown to inhibit *Staph. aureus* at a concentration of 0.5 mcg./ml.

EXAMPLE 12

The use of α-carbobenzyloxyamino-1-naphthylacetic acid (0.1 mole), which is obtained by the reaction of equivalent quantities of α-amino-1-naphthylacetic acid and benzyl chlorocarbonate in aqueous sodium hydroxide, in the process of Example 1, in the place of N-carbobenzyloxy-DL-norleucine, results in the formation of the sodium salt of α-carbobenzyloxyamino-1-naphthylmethylpenicillin.

EXAMPLE 13

When the sodium salt of α-carbobenzyloxyamino-1-naphthylmethylpenicillin (64% pure) is hydrogenated in the presence of three successive portions of pretreated palladium on barium carbonate catalyst as described in the process of Example 2, a 61% yield (40% pure) of α-amino-1-naphthylmethylpenicillin is obtained. Paper chromatography showed only one antibiotic with a considerably different $R_F$ value from the starting material. It was stable in acid solution and shown to inhibit *Staph. oxford* at a concentration of 0.025 mcg./ml.

EXAMPLE 14

The use of α-carbobenzyloxyamino-2-furylacetic acid (0.1 mole), which is obtained by the reaction of equivalent quantities of α-amino-2-furylacetic acid and benzyl chlorocarbonate in aqueous sodium hydroxide, in the process of Example 1, in the place of N-carbobenzyloxy-DL-norleucine, results in the formation of the sodium salt of α-carbobenzyloxyamino-2-furylmethylpenicillin (32% yield, 40% pure).

EXAMPLE 15

When the sodium salt of α-carbobenzyloxyamino-2-furylmethylpenicillin (40% pure) is hydrogenated in the presence of three successive portions of pretreated palladium on barium carbonate catalyst as described in the process of Example 2, a 74% yield (32% pure) of α-amino-2-furylmethylpenicillin is obtained. Paper chromatography showed only one antibiotic with a considerably different $R_F$ value from the starting material. It is stable in acid and shown to inhibit *Staph. aureus* at a concentration of 0.5 mcg./ml.

EXAMPLE 16

*Preparation of the Sodium Salt of α-Carbobenzyloxy-amino-β-Hydroxyethyl Penicillin*

One portion of N-carbobenzyloxy-DL-serine (prepared by the reaction of benzoxycarbonyl chloride and DL-serine) and triethylamine is stirred in a medium of dry acetone and cooled to −5° C. An equivalent portion of ethyl chlorocarbonate in dry acetone is then added dropwise with continued cooling and stirring for about 10 minutes. The resulting reaction mixture, (containing N-carbobenzyloxy-DL-serine ethoxyformic anhydride and suspended triethylamine hydrochloride) is then cooled to −5° C. and added slowly to a stirred ice-cold mixture prepared from 6-aminopenicillanic acid (slight excess over stoichiometric equivalent to the anhydride), 3% sodium bicarbonate solution and acetone. The mixture is allowed to attain room temperature and kept thus for 30 minutes with continued stirring and the product, the sodium salt of α-carbobenzyloxyamino-β-hydroxyethyl penicillin, is then isolated in 67% yield.

EXAMPLE 17

*Preparation of α-Amino-β-Hydroxyethyl Penicillin*

A suspension of palladium on barium carbonate (7.3 g. of 30%) in water (200 ml.) is shaken in an atmosphere of hydrogen at room temperature and atmospheric pressure for 2 hours. After this treatment the catalyst is collected and washed well with water, taking care that it does not become dry. The sodium salt of α-carbobenzyloxyamino-β-hydroxyethyl penicillin (70% pure) is added to an aqueous suspension of the pretreated catalyst and the pH is adjusted to 8 with sodium hydrogen carbonate solution (3%). The mixture is then shaken under hydrogen at room temperature and atmospheric pressure for 1 hour. Two successive portions of the pretreated catalyst are then added to the hydrogenation reaction mixture and the shaking is continued for another hour for each portion of catalyst. The catalyst is then filtered off, washed with water, and the filtrate after being adjusted to pH 7.0 with N hydrochloric acid, is evaporated to dryness under reduced pressure while the temperature is kept below 20° C. The product, α-amino-β-hydroxyethyl penicillin, is obtained in 29% yield as a solid which assays for a purity of 21%. Paper chromatography shows that this material has a considerably different $R_F$ value from that of the starting material. The product inhibits *Staph. aureus* at a concentration of 5.0 mcg./ml.

EXAMPLE 18

*Preparation of the Sodium Salt of α-Carbobenzyloxyamino-β-Hydroxy-β-Phenylethyl Penicillin*

A solution of N-carbobenzoxy-DL-threo-β-phenylserine and triethylamine in dry acetone is stirred and cooled to −5° C. The N-carbobenzoxy-DL-threo-phenylserine is prepared according to known procedures by the reaction of DL-threo-phenylserine and benzoxycarbonyl chloride. A solution of ethyl chlorocarbonate in dry acetone is added dropwise to the solution with continued cooling and stirring and after 10 minutes the resulting mixture of suspended triethylamine hydrochloride and the mixed anhydride is cooled to −5° C. and added slowly to a stirred ice-cold mixture prepared from 6-aminopenicillanic acid, 3% sodium bicarbonate solution and acetone. The mixture is allowed to attain room temperature and kept thus for 30 minutes with continued stirring. The product is then isolated to give the crude sodium salt of α-carbobenzoxyamino - β - hydroxy-β-phenylethyl penicillin (60% pure).

EXAMPLE 19

*Preparation of α-Amino-β-Hydroxy-β-Phenylethyl Penicillin*

The sodium salt of α-carbobenzyloxyamino-β-hydroxy-β-phenylethyl penicillin (60% pure) is hydrogenated in the presence of three successive portions of pretreated palladium on barium carbonate catalyst as described in Example 2 above to give α-amino-β-hydroxy-β-phenylethyl penicillin, which assays at 39% pure, in 53% yield. Paper chromatography shows only one antibiotic with a considerably different $R_F$ value from the starting material. The antibiotic is stable in acid solution and inhibits *Staph. aureus*.

EXAMPLE 20

In the procedure of Example 17 above, the sodium salt of α-carbobenzyloxyamino-β-hydroxyethyl penicillin is replaced by the sodium salt of each of the following penicillins:

α-carbobenzyloxyamino-β-hydroxy-β-(2-chlorophenyl)-ethyl penicillin,
α-carbobenzyloxyamino-β-hydroxy-β-(p-sulfamylphenyl)-ethyl penicillin,
α-carbobenzyloxyamino-β-hydroxy-β-(3,4-dimethoxyphenyl)-ethyl penicillin,
α-carbobenzyloxyamino-β-hydroxy-β-(3-methylphenyl)-ethyl penicillin,
α-carbobenzyloxyamino-β-hydroxy-β-(4-dimethylaminophenyl)ethyl penicillin,
α-carbobenzyloxyamino-β-hydroxy-β-(2-methoxyphenyl)-ethyl penicillin,
α-carbobenzyloxyamino-β-hydroxy-β-(2,4-dichlorophenyl)ethyl penicillin,
α-carbobenzyloxyamino-β-hydroxy-β-(2-nitrophenyl)-ethyl penicillin,
α-carbobenzyloxyamino-β-hydroxy-β-(2-acetamidophenyl)ethyl penicillin,
α-carbobenzyloxyamino-β-hydroxy-β-(2,4-dimethylphenyl)ethyl penicillin,
α-carbobenzyloxyamino-β-hydroxy-β-(4-isopropylphenyl)ethyl penicillin,
α-carbobenzyloxyamino-β-hydroxy-β-(3-bromophenyl)-ethyl penicillin,
α-carbobenzyloxyamino-β-hydroxy-β-(2-iodophenyl)-ethyl penicillin,
α-carbobenzyloxyamino-β-hydroxy-β-(2-trifluoromethylphenyl)ethyl penicillin,
α-carbobenzyloxyamino-β-hydroxy-β-(2-benzylphenyl)-ethyl penicillin,
α-carbobenzyloxyamino-β-hydroxy-β-(3,4,5-trimethoxyphenyl)ethyl penicillin,
α-carbobenzyloxyamino-β-hydroxy-β-(2,4,5-trimethylphenyl)ethyl penicillin, and
α-carbobenzyloxyamino-β-(2-fluorophenyl)ethyl penicillin, respectively, to produce, after hydrogenation,
α-amino-β-hydroxy-β-(2-chlorophenyl)ethyl penicillin,
α-amino-β-hydroxy-β-(p-sulfamylphenyl)ethyl penicillin,
α-amino-β-hydroxy-β-(3,4-dimethoxyphenyl)ethyl penicillin,
α-amino-β-hydroxy-β-(3-methylphenyl)ethyl penicillin,
α-amino-β-hydroxy-β-(4-dimethylaminophenyl)ethyl penicillin,
α-amino-β-hydroxy-β-(2-methoxyphenyl)ethyl penicillin,
α-amino-β-hydroxy-β-(2,4-dichlorophenyl)ethyl penicillin,
α-amino-β-hydroxy-β-(2-nitrophenyl)ethyl penicillin,
α-amino-β-(2-acetamidophenyl)ethyl penicillin,
α-amino-β-hydroxy-β-(2,4-dimethylphenyl)ethyl penicillin,
α-amino-β-hydroxy-β-(4-isopropylphenyl)ethyl penicillin,
α-amino-β-hydroxy-β-(3-bromophenyl)ethyl penicillin,
α-amino-β-hydroxy-β-(2-iodophenyl)ethyl penicillin,
α-amino-β-hydroxy-β-(2-trifluoromethylphenyl)ethyl penicillin,
α-amino-β-hydroxy-β-(2-benzylphenyl)ethyl penicillin,
α-amino-β-hydroxy-β-(3,4,5-trimethoxyphenyl)ethyl penicillin,
α-amino-β-hydroxy-β-(2,4,5-trimethylphenyl)ethyl penicillin, and
α-amino-β-hydroxy-β-(2-fluorophenyl)ethyl penicillin, respectively, each of which is isolated and found to inhibit *Staph. aureus* at concentrations of 0.001 percent by weight. The N-carbobenzyloxy derivatives which are hydrogenated by the procedure of Example 2 as described above are each produced by protecting the amino group of the appropriate α-amino-β-hydroxy-β- (substituted phenyl)propionic acid, forming the mixed anhydride of such acid by reaction with ethyl chlorocarbonate, and reacting the mixed anhydride with 6-aminopenicillanic acid as shown in Example 16 above.

EXAMPLE 21

*Preparation of the Sodium Salt of Carbobenzyloxyaminomethyl Penicillin*

A solution of N-carbobenzoxy glycine (450 mgm.) and triethylamine (0.3 ml.) in dry acetone (10 ml.) is stirred and cooled to −5° C. The N-carbobenzoxylglycine is prepared according to known procedures by the reaction of glycine and benzoxycarbonyl chloride. A solution of ethyl chlorocarbonate (0.2 ml.) in dry acetone (2 ml.) is added dropwise with continued cooling and stirring and after 10 minutes the resulting mixture (containing N-carbobenzoxy glycine ethoxy-formic anhydride and suspended triethylamine hydrochloride) is cooled to −50° C. and added slowly to a stirred ice-cold mixture prepared from 6-aminopenicillanic acid (430 mgm.), 3% sodium bicarbonate solution (17 ml.) and acetone (5 ml.). The mixture is allowed to attain room temperature and kept thus for 30 minutes with continued stirring. The product is then isolated to give the crude sodium salt of carbobenzoxyaminomethyl penicillin (469 mgm.) (purity 63%). The percentage remaining after 2 hours at pH 2 is 94%.

EXAMPLE 22

Preparation of Aminomethyl Penicillin

A suspension of palladium on barium carbonate (7.3 g., of 30) in water (200 ml.) is shaken in an atmosphere of hydrogen at room temperature and atmospheric pressure for 2 hours. After this treatment the catalyst is collected and washed well with water, taking care that it never becomes dry. The sodium salt of carbobenzyloxyaminomethyl penicillin (4.5 g., of a material assaying at a purity of 40%) was added to an aqueous suspension of the pretreated catalyst and the pH adjusted to 8.0 with sodium hydrogen carbonate solution (3%). The mixture is then shaken under hydrogen at room temperature and atmospheric pressure for 45 minutes. A second quantity of palladium on barium carbonate (7.3 g., of 30%), previously reduced as before, is added and the hydrogenation continued for a further 45 minutes. The catalyst is filtered off, washed with water, and the filtrate, after adjusting to pH 7.0 with N hydrochloric acid, is evaporated to dryness under reduced pressure at a temperture below 20° C. The aminomethyl penicillin is obtained as a yellow powder (3.0 g.) which assays for a purity of 33%. Paper chromatography shows that this material contains only one antibiotic which has a considerably different $R_F$ value from the starting material. The product is shown to be stable in acid solution and to inhibit Staph. aureus at a concentration of 1.25 mcg./ml.

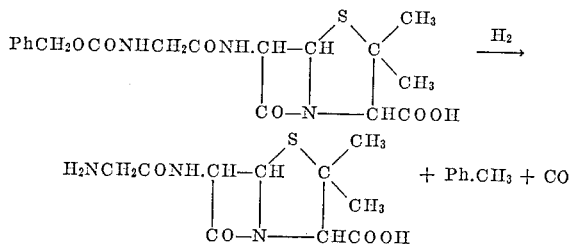

EXAMPLE 23

Preparation of β-Aminoethylpenicillin

The sodium salt of β-carbobenzyloxyaminoethylpenicillin (50% pure) is hydrogenated in the presence of three successive portions of pretreated palladium on barium carbonate catalyst as described in Example 2 to give β-aminoethylpenicillin, which assays at 30% pure, in 40% yield. Paper chromatography shows only one antibiotic with a considerably different $R_F$ value from the starting material. It is stable in acid solution and is shown to inhibit Staph. aureus at a concentration of 2.5 mcg./ml.

The β-carbobenzyloxyaminoethylpenicillin used in this experiment is prepared in 27% yield from 6-aminopenicilianic acid and a mixed anhydride prepared from N-carbobenzyloxy-β-alanine and ethyl chlorocarbonate according to the general procedure of Example 21 above. The N-carbobenzyloxy-β-alanine is prepared according to known procedures by the reaction of β-alanine and benzoxycarbonylchloride.

EXAMPLE 24

Preparation of 5-Aminopentylpenicillin

The sodium salt of 5-carbobenzyloxyaminopentylpenicillin (69% pure) is hydrogenated in the presence of four successive portions of pretreated palladium on barium carbonate catalyst as described in Example 22 to give 5-aminopentylpenicillin, which assays at 52% pure, in 55% yield. Paper chromatography shows only one antibiotic with a considerably different $R_F$ value from the starting material.

The 5-carbobenzyloxyaminopentylpenicillin used in this experiment is prepared in 56% yield from 6-aminopenicillanic acid and a mixed anhydride prepared from 6-carbobenzyloxyaminohexanoic acid and ethyl chlorocarbonate according to the general procedure of Example 21 above. The 6-carbobenzyloxyaminohexanoic acid is prepared according to known procedures by the reaction of 6-aminohexanoic acid and benzoxycarbonyl chloride.

EXAMPLE 25

The use of ω-carbobenzyloxyaminolauryl penicillin and -carbobenzyloxyaminostearyl penicillin in the procedure of Example 24 produces ω-aminoundecyl penicillin which may also be named 6-(12-aminolauramido)penicillanic acid, and ω-aminoheptadecyl penicillin, which may also be named 6-(18-aminooctadecanamido)penicillanic acid. Each is found to be effective in the inhibition of Staph. aureus at a concentration of one part in 12,000,000.

Preparation of 6-Aminopenicillanic Acid

The intermediate 6-aminopenicillanic acid is isolated after removal of the natural penicillins from penicillin fermentation broths prepared without the use of added precursors such as phenylacetic acid. For this purpose, suitable penicillin-producing moulds include species of Penicillium, for example Penicillium chrysogenum 5120C, and the members of the notatum-chrysogenum group. The mould is grown preferably under aerobic submerged conditions, the culture medium used can be one of the generally accepted media commonly used in the preparation of penicillins. The culture medium usually consists essentially of a carbohydrate nutrient material, for example glucose or lactose; calcium carbonate, sodium sulphate, and a nitrogenous material capable of providing the nitrogen necessary for the growth of the mould. The nitrogenous material can be either a natural substance, for example peanut meal, or it can be one or more chemical compounds containing nitrogen, for example ammonium salts such as ammonium lactate or ammonium acetate. Where one or more chemical compounds are used as the nitrogenous material it is usual to incorporate in the culture medium very small amounts of a number of metals such as calcium, iron, zinc, copper, magnesium and manganese and these are normally introduced in the form of an aqueous solution of their salts. A suitable culture medium containing ammonium salts as the nitrogenous material is described by Jarvis and Johnson, J.A.C.S. 69, 3010 (1947), and J. Bact. 59, 51 (1950). Natural nitrogenous materials such as peanut meal usually contain sufficient amounts of suitable inorganic salts and thus when such materials are used in the culture medium it is usually not necessary to make a separate addition of inorganic salts.

The fermentation conditions used in the preparation of the fermentation liquor used in this invention can vary between wide limits, but it has been found preferable to use conditions similar to those commonly used in the preparation of penicillin G. The temperature employed is preferably one from 20° C. to 35° C. and very satisfactory results have been obtained using a temperature of 25–27° C. The time required for the fermentation depends upon the culture medium and the mould used and the temperature at which the fermentation is carried out. Normal fermentation times are from 48 to 120 hours. The progress of the fermentation can be followed by means of periodic assay.

The fermentation liquor is obtained most satisfactorily when the fermentation is carried out under highly aerobic conditions. In the small scale operations referred to in the examples of this specification, aerobic conditions were achieved by shaking the fermentation mixture on a rotary shaking machine. When working on a larger scale, aerobic conditions can conveniently be obtained either by bubbling air or oxygen through the fermentation mixture, or by rapidly stirring the fermentation mixture. If desired, a combination of stirring and the bubbling of air or oxygen can be used.

It is sometimes preferred to prepare the antibiotic substances by the use of the isolated 6-aminopenicillanic acid or one of the intermediate concentrates obtained during its isolation. A concentrated solution of 6-aminopenicillanic acid can be prepared by evaporating the clarified harvest brew at reduced temperature and pressure to a small volume. If desired, the penicillins present in the brew can be largely removed by extraction with an organic solvent such as butyl acetate at an acid pH. After neutralizing the liquid substantial amounts of impurities can then be precipitated by the addition of solvents such as acetone, methanol or ethanol. After separating such impurities the clear liquor may then be further concentrated to give a concentrated preparation.

The production by the process of this invention of antibiotic material from fermentation liquor having little or no antibiotic activity is clearly indicated if, before the addition of one of the chemical reagents hereinfore specified to the fermentation liquor, the penicillins already present as a result of the fermentation reaction by which the fermentation liquor was obtained are removed. This removal can readily be achieved as indicated above by extracting the penicillins from the acidified fermentation liquor by means of an organic solvent, for example, butyl acetate, in which the penicillins are soluble.

Thus, 6-aminopenicillanic acid was prepared and isolated as follows:

(a) A strain of *Penicillium chrysogenum* 5120C (obtained from Professor E. B. Chain, Istituto Superiore di Sanita, Rome), was first grown on a glycerol-molasses agar slope for 7 days at 26° C. Sterile distilled water was then added and the spores washed off the surface of the culture to produce a spore suspension. About 10 mls. of this suspension were used to inoculate 5 litres of seed medium in a 10-litre stainless steel stirred fermenter. The seed medium contained 8% w./v. corn steep liquor, 6% w./v. of dextrin and tap water, the pH being adjusted to 6.1 before sterilizing the fermenter and its contents. The tank was stirred at 500 r.p.m. with an air flow of 1 vol./vol./min. and maintained at 27° C. for 48 hours. A volume of 3.2 litres of the contents of this fermenter was then transferred aseptically into a 90-litre stainless steel fermenter containing 50 litres of fermentation medium consisting of peanut meal 3.0% w./v., lactose 4.0% w./v., $Na_2SO_4$ 0.1% w./v., $CaCO_3$ 1.0% w./v. and tap water. The pH was adjusted to 7.2 before the fermenter and its contents were sterilized. After inoculation the tank was maintained at 26–28° C. for 4 days and stirred at 600 r.p.m. by means of an impeller of 12.5 cms. diameter. Air bubbled through the tank at the rate of 1 vol./vol./min. Foaming was controlled by the periodic addition of lard oil containing 2% of octadecanol.

The brew obtained was clarified and 40 litres thereof was concentrated in vacuo to a volume of 4 litres. The pH was then adjusted to 3.0 and the precipitate which formed was removed by centrifuging and the clear liquor was extracted once with half its volume of butyl acetate. The aqueous phase was separated and the pH adjusted to 7.5. 3 vols. of acetone was then added with stirring and the precipitate removed by centrifuging. The clear liquor was then concentrated at 2280 mls. and the pH adjusted to 7.0. It had a potency of 54 u./mgm. assayed as described below.

The 6-aminopenicillanic acid was assayed by reacting a sample with phenylacetyl chloride and assaying the penicillin found by the cup plate method described by N. G. Heatley in Biochem. J., 38, 61 (1944), using *B. subtilis* as the bacterium. The purity of the preparation can then be expressed in units per mgm. (u./mgm.) of dry substance.

The potency of pure 6-aminopenicillanic acid assayed by this method is 2750 u./mgm.

(b) 1200 mls. of the concentrate of potency 54 u./mgm. were percolated through 200 gms. of Dowex I resin conditioned with hydrochloric acid. The column was washed with water and this wash was combined with the percolate. The assay of this solution proved it to contain 15% of the 6-aminopenicillanic acid applied. The column was then eluted with 0.05 N hydrochloric acid. The pooled active fractions of the eluate contained 81% of the original 6-aminopenicillanic acid, the solution assaying at 900 u./mgm. The eluate was then adjusted to pH 6.0 and concentrated to 25 mls. in vacuo, concentrated hydrochloric acid was added with stirring to bring the pH to 4.3 and the crystalline 6-aminopenicillanic acid then filtered off and washed with water followed by acetone, and then dried in vacuo. The yield was 1.0 gm. assaying at 2200 u./mgm. (80%) pure. Repeated precipitation of the crystalline material from neutral aqueous solution by the addition of hydrochloric acid gave a white crystalline solid of melting point 209–210° C. assaying at 2740 u./mgm. analyzing as follows. (Found: C, 44.6; H, 5.7; N, 13.1; S, 14.1%. $C_8H_{12}O_3N_2S$ requires: C, 44.4; H, 5.6; N, 13.0; S, 14.8%.)

This application is a continuation-in-part of our applications Serial No. 844,161; Serial No. 844,163; and Serial No. 844,167, all filed October 5, 1959, and now abandoned.

We claim:

1. A member selected from the group consisting of acids having the formulas:

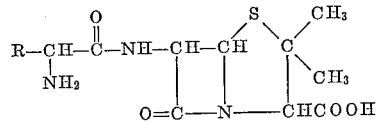

wherein R is a member selected from the group consisting of alkyl, indolylmethyl, cycloalkyl, naphthyl, benzyl and furyl; and

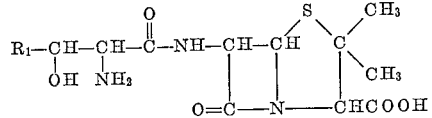

wherein $R_1$ is a member selected from the group consisting of hydrogen, (lower)alkyl, benzyl and radicals having the formula

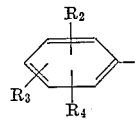

wherein $R_2$, $R_3$, and $R_4$ each represent a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro, and trifluoromethyl; and their sodium, potassium, calcium, aluminum and ammonium salts and their nontoxic substituted ammonium salts with an amine selected from the group consisting of tri(lower)alkylamines, procaine, dibenzylamine, N-benzyl-beta-phenethylamine, 1-ephenamine, dehydroabietylamine, N,N'-bis-dehydroabietylethylenediamine, N,N' - dibenzylethylenediamine, and N-(lower)alkylpiperidine.

2. α-Aminopentylpenicillin.
3. α-Aminoheptylpenicillin.
4. α-Aminocyclohexylmethylpenicillin.
5. α-Amino-β-phenylethylpenicillin.
6. α-Amino-β-3-indolylethylpenicillin.
7. α-Amino-1-naphthylmethylpenicillin.
8. α-Amino-2-furylmethylpenicillin.
9. α-Aminoisobutylpenicillin.
10. α-Amino-β-hydroxy-β-phenylethyl penicillin.

11. A member selected from the group consisting of the acids having the formula

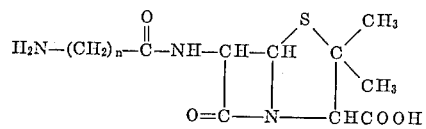

wherein $n$ is an integer from 1 to 20; and their sodium, potassium, calcium, aluminum and ammonium salts and its nontoxic substituted ammonium salts with an amine selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine, and N-(lower)alkylpiperidine.

12. 5-Aminopentyl penicillin.

References Cited in the file of this patent

Clarke et al.: The Chemistry of Penicillin, pages 660, 667–669 (1949). (Call No. RS 165 P38 C4.)